United States Patent [19]

Stevens

[11] Patent Number: 5,639,090
[45] Date of Patent: Jun. 17, 1997

[54] GEOBOARD WITH MOVABLE PINS

[76] Inventor: Kenneth V. Stevens, 728 Carroll St., Brooklyn, N.Y. 11215

[21] Appl. No.: 700,272

[22] Filed: Aug. 20, 1996

[51] Int. Cl.⁶ ..................................................... A63F 3/00
[52] U.S. Cl. ........................... 273/287; 273/281; 273/284; 273/159; 434/211; 434/216
[58] Field of Search ............................ 273/241, 276, 273/281, 283, 284, 287, 159, 153 S; 434/211, 216; 446/490

[56] References Cited

U.S. PATENT DOCUMENTS

| | | | |
|---|---|---|---|
| 640,555 | 1/1900 | Fuller | 273/159 |
| 658,083 | 9/1900 | Favour | 273/159 |
| 923,863 | 6/1909 | Lehr | 273/159 |
| 3,672,679 | 6/1972 | Burns | 273/284 |
| 3,797,134 | 3/1974 | Wingerd | 434/216 |
| 3,891,219 | 6/1975 | Foerst | 273/281 |
| 5,328,374 | 7/1994 | Stevens | 434/216 |
| 5,433,611 | 7/1995 | Dreyfous | 434/211 |

*Primary Examiner*—William M. Pierce
*Attorney, Agent, or Firm*—Notaro & Michalos P.C.

[57] ABSTRACT

A geoboard has a board member with a plurality, advantageously four edges. An array of holes which is preferably in the form of a matrix, is provided in the board member for receiving slidably mounted push-up pins. Each push-up pin has upper and lower positions and the pins are arranged in the matrix for engagement by an elastic band to form shapes on the board member. Each of the edges includes spaced-apart notches for receiving fixed slider pins which extend in a row on a slider. Each slider is slidably mounted along one of the edges for extending the matrix of push-up pins.

14 Claims, 3 Drawing Sheets

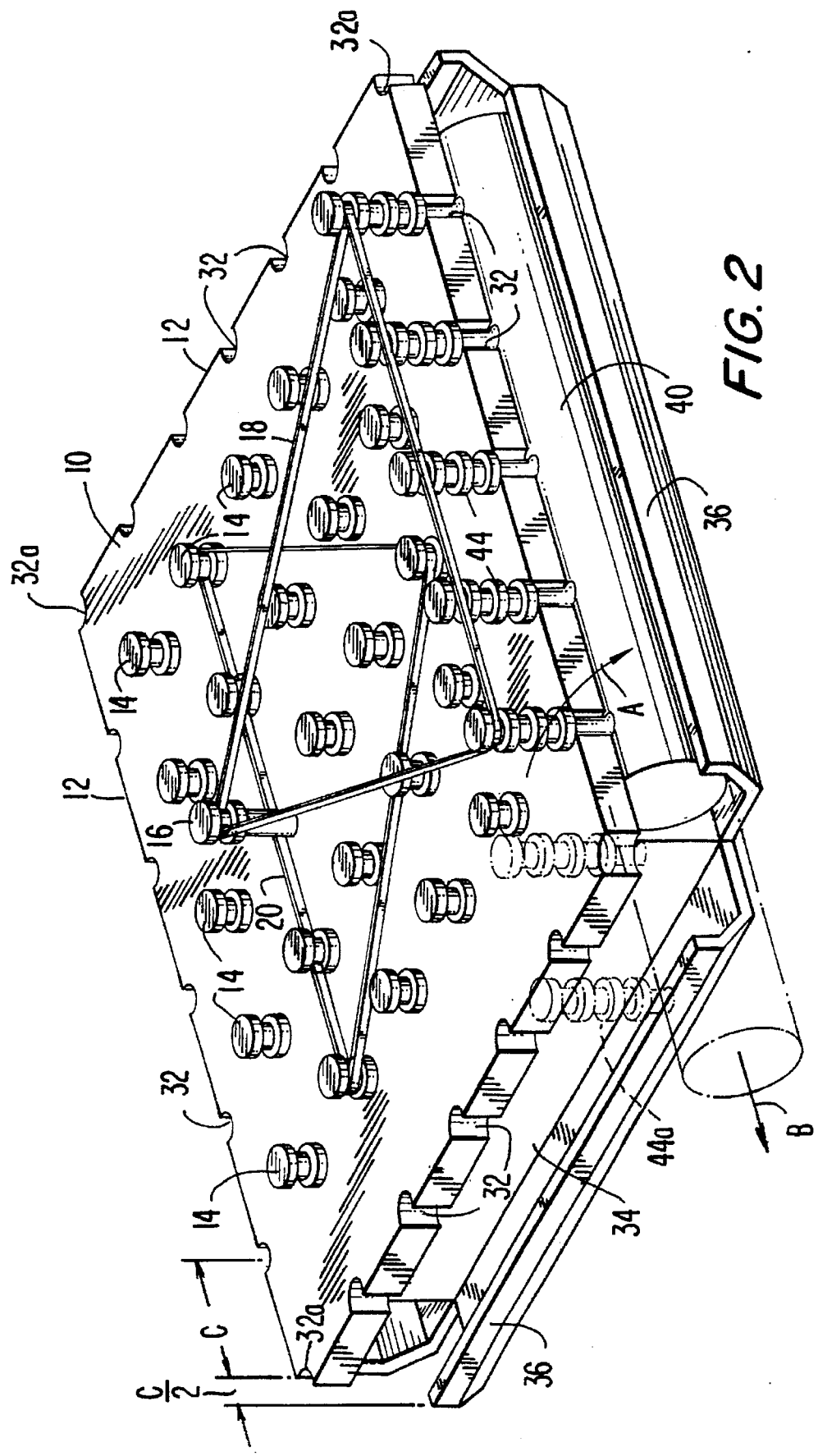

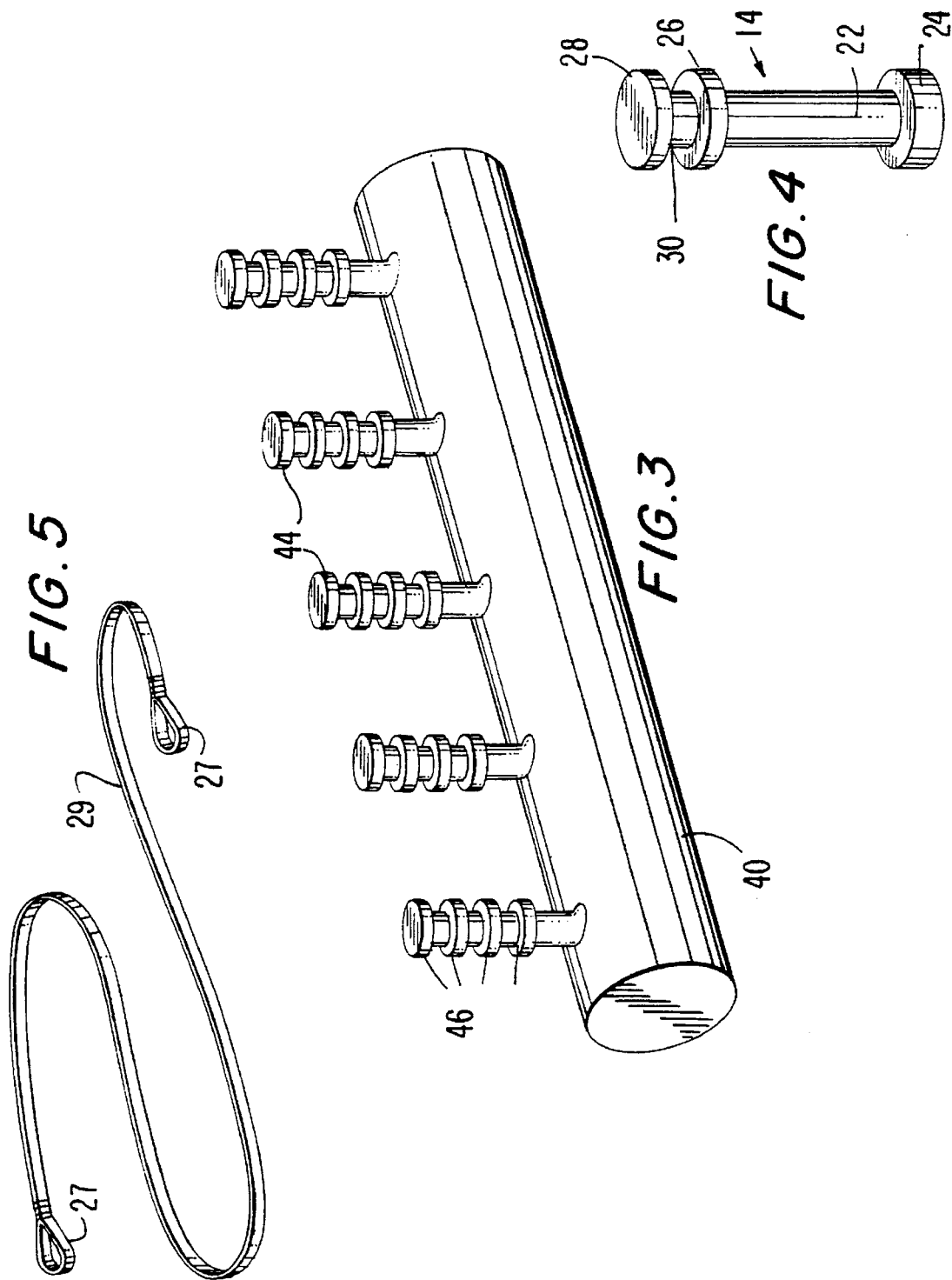

GEOBOARD WITH MOVABLE PINS

FIELD AND BACKGROUND OF THE INVENTION

The present invention relates, in general, to geometry boards, and in particular to a new and useful geoboard which has movable pins.

Over the past several years the character of mathematics education has changed quite dramatically. Students are no longer limited to exercising their minds with the old traditional kit of paper and pencil or black board and chalk, ruler, triangle and protractor. A new category of teaching/learning aids has come to the fore in schools from pre-kindergarten through the sixth grade. They are collectively called "manipulatives." These devices are designed to encourage children to explore mathematical concepts by simple processes of physically holding, shifting, re-arranging, linking or stacking various parts and components.

Prominent among the manipulatives is the geoboard shown in FIG. 1. Usually made of plastic or wood, it is a handheld square board with short fixed pins or pegs 11 on its surface. The fixed pins can be arrayed in a variety of grid patterns, e.g. 5×5, 11×11 or 27×27; or in a circular pattern. The board is used in conjunction with colored rubber bands. With his or her fingers, the user stretches a rubber band 15 around a number of pegs to form a geometric shape. Many shapes can be made with different rubber bands and shapes can overlap each other. Explorations in symmetry, area, perimeter and other topics are structured for the young student.

SUMMARY OF THE INVENTION

An object of the present invention is to provide an improved geoboard which has increased capabilities and advantages over known geoboards.

The present invention improves upon the geoboard by adding significant new capabilities, thereby expanding the exploratory options. The geoboard of the invention has notched edges and a field of fixed-location push-up pegs or pins. The board has slide brackets mounted on the sides beneath the edges. These brackets accept slides of varying lengths with linear pin or peg arrays. Since the pins on the geoboard can be pushed up or down, it is possible to highlight geometric shapes by up or down positions. In addition to using rubber bands, the invention uses elastic lines with looped or tied ends. The board may be used with or without the pegged sliders. When a slider is placed in the brackets, it becomes a new perimeter row of pegs or pins. By sliding in the bracket, this row of pins has the unique property of movement and can be precisely re-aligned with other rows of pins by engaging with the board's edge grooves which serve as stops. The fixed pins of the sliders have grooves or stepped rings to keep the rubber band or elastic line in a desired vertical position. This feature prevents the band from slipping when the slider is tilted and shifted into a new horizontal position in the bracket. Grooves or rings on the push-up pins are related to similar levels on the slider pins or on other push-up pins. The variability of the height of the board or field pins allow several layers of geometric shapes to be constructed. The low points of the push-up pins are designed to keep the pin heads below the movement of rubber bands when a sliding construction moves across the board. Because a slider can extend beyond the end of a bracket, due to its open end, it is possible with this invention to enlarge the size of the construction area. This work space can be further increased by linking additional boards with the sliders serving as spanner or bracket-to-bracket fasteners. Other clips between brackets are also possible means for linking boards to each other.

Accordingly, an object of the present invention is to provide a geoboard comprising: a board member having a plurality of edges and defining an area; a plurality of movable push-up pins mounted in a fixed array in the area and to the board, each push-up pin being mounted for movement between a lowered position and at least one raised position; and band means for engaging a plurality of the push-up pins to form a shape.

Another object of the present invention is to provide such a geoboard which includes a slider for sliding adjacent at least one of the edges, the one edge having notches and the slider having slide pins which are engagable with the notches. The slide pins can cooperate with the push-up pins to engage a band to increase the number of shapes which can be formed using the geoboard.

A further object of the invention is to provide a geoboard which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

NEW BRIEF DESCRIPTION OF THE DRAWINGS

In the drawings:

FIG. 2 is a perspective view of the geoboard of the present invention;

FIG. 3 is a perspective view of a slider with slider pins of the present invention;

FIG. 4 is a perspective view of a push-up pin of the present invention; and

FIG. 5 is a perspective view of an elastic band which can be used with the present invention.

DESCRIPTION OF THE PREFERRED EMBODIMENT

Figure 1:
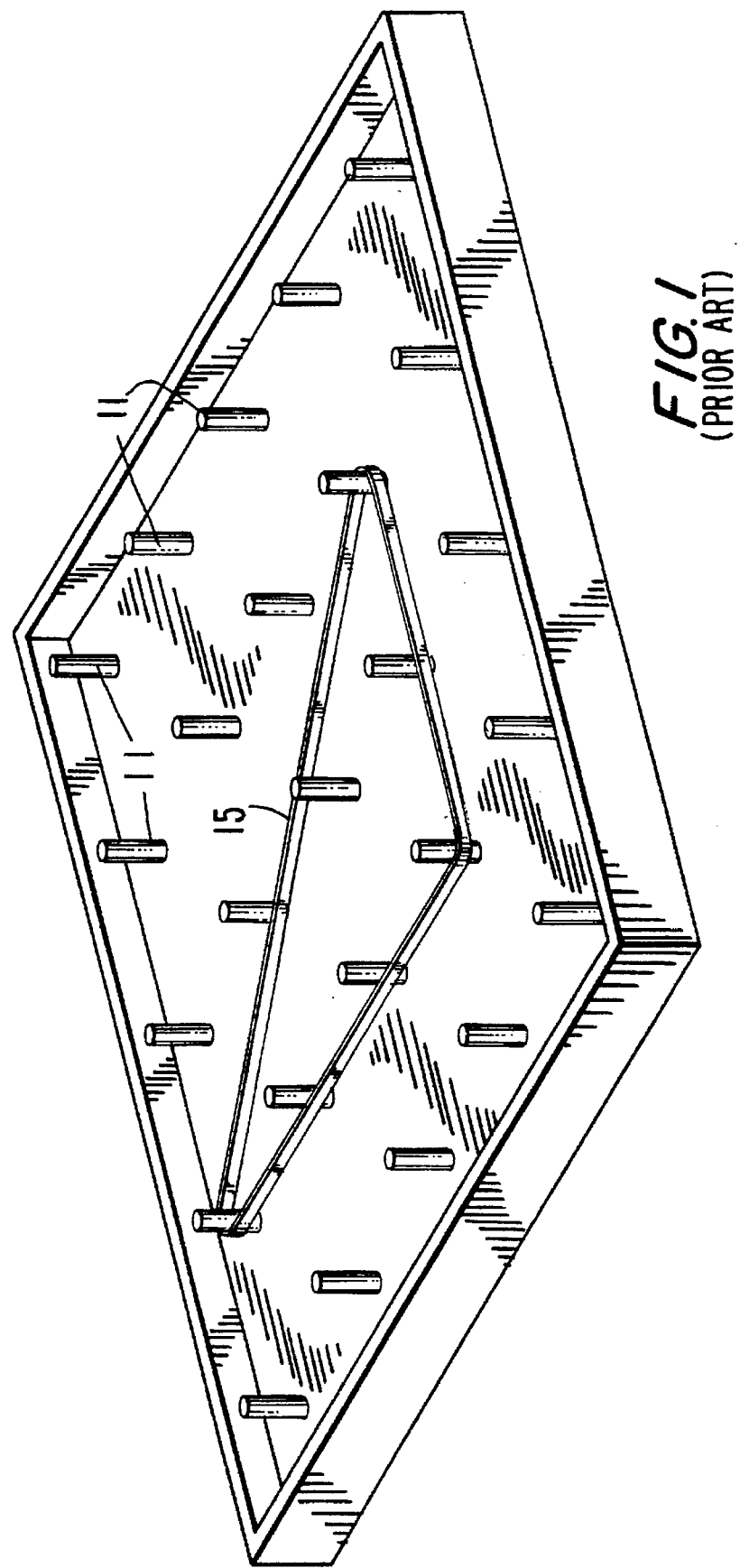
FIG. 1 is a perspective view of a known geoboard.

Referring to the drawings in particular, the invention embodied in FIG. 2 comprises a geoboard having a board member 10, with a plurality of edges 12 defining an area. Advantageously, the board is rectangular, for example square, having four edges 12, although the invention is not limited to this geometry. The board, for example, may be circular, oval, triangular, pentagonal, hexagonal, or any other shape.

A plurality of push-up pins 14 are friction fit into an array of holes in the area of the board 10 so that the pins are in a fixed array on the board area, for example a rectangular matrix. In the embodiment of FIG. 2 the matrix comprises 5×5 pins but any other matrix can be used and, in fact, any other array which may not be linear, may also be used. Pins 14 may alternatively be twist-and-lock fit or threaded to the board or mounted in any other way to allow for height adjustment.

Each push-up pin 14, as shown in FIG. 4, has a shank 22 with a diameter which is equal to or slightly less than the diameter of a corresponding hole in the board member 10, so that the pin can be pushed up or down along shank 22 and stay in the position it is put in by friction with the wall of the hole. A lower stop 24 having a larger diameter than the board member hole is fixed to the lower end of shank 22 and an upper stop 26 is fixed at an intermediate location along the shank 22. A top ring 28 is fixed to the top of shank 22. A groove or notch 30 is formed between the top ring 28 and the upper stop 26, which is also ring shaped. Groove 30 can be used to capture band means, in the form of an elastic band or cord as will be explained later in this disclosure.

The lower stop 24 prevents the push pin from being removed entirely from the board when it is in its raised position.

Returning to FIG. 2, all of the push-up pins 14 in the array are shown in their lowered position except for the pin labels 16 which has been slid upwardly into its raised position.

Band means in the form of a closed loop, elastic band 20, is shown engaged around a plurality of the pins in the array, to form a triangular shape.

In accordance with the invention, each of the edges 12 contain a plurality of spaced notches 32 which are spaced apart by the same distance as the holes that form the array for receiving the push-up pins 14. Extending downwardly from the lower surface of board member 10 is a rectangular or square support 34. Legs or shafts may also be used as well as supports for the board member. Four bent brackets 36 extend outwardly from the four sides of support 34. Each bracket cooperates with a side of the support 34 and an overhanging portion of the board member 10, to form a guide which is shaped to slidably and rotationally receive a slider 40.

A separate slider can be mounted in each of the four guides around the support 34 or fewer than all of the guides may contain a slider. In the embodiment shown in FIG. 2, only one slider 40 is illustrated.

As shown in FIG. 3, each slider comprises a cylindrical body. A plurality of slider pins 44 are fixed to and extend upwardly from the cylindrical body and form an additional row of pins that can be viewed as a further line in the matrix or array of push-up pins as shown in FIG. 2.

Each of the slider pins 44 includes a plurality of vertically spaced rings 46 with a groove being formed between each pair of adjacent rings.

As shown in FIG. 2, with each of the slider pins 44 engaged in its own edge notch 32, slider 40 presents the slider pins 44 so that their upper pin notches can be used in conjunction with the raised push-up pin 16, to form a shape by engagement with an elastic band 18. The shape can overlap the shape made with elastic band 20 to produce additional geometric configurations.

The lower grooves in each slider pin 44 can be used with the lowered push-up pins 14 to effectively enlarge the area of board member 10.

To further enlarge the area, slider 40 can be rotated in the direction of arrow A, to disengage the slider pins 44 from their notches 32, and then slid in the direction of arrow B, laterally along the guide and beyond the guide and the edge of the board member 10. In this position one or more of the slider pins, for example a pin shown at 44a, extends beyond the area of board member 10 and can be used to further enlarge the working area of the geoboard. The slider 40 can also be used as a link mechanism between two adjacent boards which are placed one next to another with their brackets 36 touching. In this position, slider 40 can be slid along its guide to span both boards and link them together. The linking is achieved by the fact that at least one of the slider pins 44 is engaged in a notch of one of the board members, and another slider pins 44 is engaged with a notch of the other board (not shown).

So that this linking can occur, the partial notch at the corners of the board member at 32a, are spaced from the outer edge of an adjacent bracket 36 by ½ the distance C, between adjacent notches.

Although only an upper and lower position is shown for the push-up pins, the pins may have more raised positions with additional grooves. The slider pins 44 may also have additional grooves.

FIG. 5 illustrates an example of the band means which can be used according to the present invention. The band means can either be a closed loop elastic band 18, 20, or an open elastic cord 29 having opposite end loops 27 for engaging around the groove of one of the pins. The cord can then be stretched around a selected plurality of pins to form a polygonal shape with the opposite loop being engaged around the same pin as the first loop to form a closed shape. Alternatively, open shapes can be formed where the end loops 27 are engaged around different pins.

It should be clear that the pins may be in the raised or lower positions if they are the push-up pins or grooves at different levels on the slider pins 44 can be used to create a multiplicity of shapes and combinations of shapes at a plurality of levels on the board.

Although each of the push-up pins has been described to have only a single lowered position and a single raised position, as noted above, intermediate positions are also possible and higher positions are possible with additional ring shaped stops or rings mounted on the shank 22 and longer shanks.

The lower stop 24 is also optional since pins without lower stops can be used and can be removable from the board if desired.

Instead of notches 32, sliders 40 may alternatively be held in place by other stop means, such as a spring-loaded stop pin or push button stops in (not shown) the bracket that engages holes in the slider or using a lower level slider-and-bracket groove pattern (not shown). To use the enhanced function geoboard of the invention, push-up pins are chosen to outline a geometric shape. A colored rubber band is placed around the base of these pins. A slider is inserted into a bracket and its pins are engaged with desired board notches. A differently colored rubber band is stretched around the upper grooves of one or more pins of the first shape and around one or more slider pins. The configuration is then observed for the overlapped shapes. The slider is moved one or more notches in either direction. The changes are observed as lines of overlap shrink and stretch to make new shapes. Note changes in perimeter and symmetry. Another slider can be added and another shape connected across the board from slider to slider. Note how the forms change when sliders move relative to each other and in relation to the original shape created below on the field pins. To create a linear shape, use a loop-ended elastic line.

While a specific embodiment of the invention has been shown and described in detail to illustrate the application of the principles of the invention, it will be understood that the invention may be embodied otherwise without departing from such principles.

What is claimed is:

1. A geoboard comprising:
   a board member having a plurality of edges and defining an area;

a plurality of movable push-up pins mounted in a fixed array in the area and to the board, each push-up pin being mounted for movement between a lowered position and at least one raised position; and band means for engaging a plurality of said push-up pins to form a shape;

said push-up pins each containing groove means for receiving said band means, said groove means being engagable against said board to fix the lowered position for each push-up pin and each push-up pin having means at its lower end for fixing the raised position of each said push-up pin.

2. A geoboard according to claim 1, wherein said band means comprises a closed loop elastic band.

3. A geoboard according to claim 1, wherein said band means comprises an elastic cord having opposite ends and means at each of said opposite ends for engaging a push-up pin.

4. A geoboard comprising:

a board member having a plurality of edges and defining an area;

a plurality of movable push-up pins mounted in a fixed array in the area and to the board, each push-up pin being mounted for movement between a lowered position and at least one raised position;

band means for engaging a plurality of said push-up pins to form a shape; and a slider slidably engaged adjacent at least one of said edges, a plurality of slider pins connected to said slider for establishing a relative position between said slider and said board member, each of said slider pins being engagable by said band means to cooperate with said push-up pins to form shapes.

5. A geoboard according to claim 4, wherein each of said push-up and slider pins contain groove means for receiving said band member.

6. A geoboard according to claim 4, including stop means between said slider and said board member for holding a relative position between said slider and said board member.

7. A geoboard according to claim 6, wherein said stop means comprise at least one of said edges containing a plurality of spaced notches, said slider pins being engaged with said notches to fix the relative position between said slider and said board member.

8. A geoboard according to claim 4, including means defining a guide for slidably engaging said slider to said board member.

9. A geoboard according to claim 8, wherein said guide means comprises a bracket and a support connected to said board member for defining the guide for slidably receiving said slider.

10. A geoboard according to claim 9, wherein at least one of said edges contains a plurality of spaced apart notches, said notches being spaced apart by an amount equal to a spacing between said push-up pins in said fixed array.

11. A geoboard according to claim 10, wherein a distance between a last notch in the at least one edge and an outer edge of the bracket is equal to one half distance between a pair or adjacent notches in the at least one edge, so that a pair of geoboards can be engaged against each other and held against each other with a slider which is positioned so that at least one of the slider pins is in a notch in one of the geoboards and another one of the slider pins is in a notch in the other geoboard.

12. A geoboard comprising:

a board member having a plurality of edges and defining an area;

a plurality of movable push-up pins mounted in a fixed array in the area and to the board, each push-up pin being mounted for movement between a lowered position and at least one raised position; and band means for engaging a plurality of said push-up pins to form a shape;

each push-up pin comprising a shank, the board member having a plurality of holes each for slidably receiving a shank of a push-up pin, each push-up pin including means defining a groove at an upper end of said shank, each pin including a lower stop ring and an upper stop ring, the upper stop ring defining at least part of said groove means.

13. A geoboard according to claim 12, including a top ring at an upper end of said push-up pin for defining said groove means.

14. A geoboard comprising:

a board member having a plurality of edges and defining an area;

a plurality of movable push-up pins mounted in a fixed array in the area and to the board, each push-up pin being mounted for movement between a lowered position and at least one raised position; and band means for engaging a plurality of said push-up pins to form a shape;

said board member being rectangular and having four edges, each of said edges including a plurality of spaced apart notches, said array comprising a rectangular matrix and said notches being positioned to comprise an additional row or column of said matrix.

* * * * *